(12) United States Patent
Kodjagueuzian et al.

(10) Patent No.: US 11,562,193 B2
(45) Date of Patent: Jan. 24, 2023

(54) METHOD FOR MANUFACTURING A MICROCHIP SUPPORT WITH A SURFACE EFFECT

(71) Applicant: THALES DIS FRANCE SAS, Meudon (FR)

(72) Inventors: Gilles Kodjagueuzian, Gémenos (FR); Stéphane Karafotis, Gémenos (FR); Sébastien Subra, Gémenos (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/273,515

(22) PCT Filed: Aug. 30, 2019

(86) PCT No.: PCT/EP2019/073199
§ 371 (c)(1),
(2) Date: Mar. 4, 2021

(87) PCT Pub. No.: WO2020/048885
PCT Pub. Date: Mar. 12, 2020

(65) Prior Publication Data
US 2021/0201103 A1    Jul. 1, 2021

(30) Foreign Application Priority Data
Sep. 4, 2018 (EP) ..................... 18306165

(51) Int. Cl.
*G06K 19/06*        (2006.01)
*G06K 19/077*       (2006.01)
(Continued)

(52) U.S. Cl.
CPC ..... *G06K 19/07716* (2013.01); *B42D 25/324* (2014.10); *B42D 25/373* (2014.10);
(Continued)

(58) Field of Classification Search
CPC ....... G06K 19/07716; G06K 19/07718; B42D 25/324; B42D 25/373; B42D 25/425; B42D 25/455; B42D 25/46
(Continued)

(56) References Cited

U.S. PATENT DOCUMENTS 3,897,964 A   8/1975 Oka et al.
4,325,196 A   4/1982 Gauch et al.
(Continued)

FOREIGN PATENT DOCUMENTS

CN   101801665 A   8/2010
EP   3007404 A1    4/2016

OTHER PUBLICATIONS

International Search Report (PCT/ISA/210) dated Oct. 25, 2019, by the European Patent Office as the International Searching Authority for International Application No. PCT/EP2019/073199.
(Continued)

*Primary Examiner* — Jamara A Franklin
(74) *Attorney, Agent, or Firm* — Marc Boillot— Thales DIS CPL USA, Inc

(57) ABSTRACT

The invention relates to a method for producing a support body in a card format, with a graphic customization, that has a surface finishing effect that is more or less smooth, rough, mirrored or matte on the support body. The method includes supplying a support body having a layer of material configured to allow a marking by punching or lamination. The layer is exposed on the main external face and the surface finishing effect is equivalent to that obtained by a step of marking or lamination while not including a step of depositing varnish.

15 Claims, 2 Drawing Sheets

(51) Int. Cl.
    *B42D 25/324*     (2014.01)
    *B42D 25/373*     (2014.01)
    *B42D 25/425*     (2014.01)
    *B42D 25/455*     (2014.01)
    *B42D 25/46*     (2014.01)

(52) U.S. Cl.
    CPC ......... *B42D 25/425* (2014.10); *B42D 25/455* (2014.10); *B42D 25/46* (2014.10); *G06K 19/07718* (2013.01)

(58) Field of Classification Search
    USPC ....................................................... 235/487
    See application file for complete search history.

(56) References Cited

U.S. PATENT DOCUMENTS

2003/0096084 A1    5/2003  Hoppe et al.
2015/0035269 A1*  2/2015  Hooper .................. G07D 7/12
                                                359/558

OTHER PUBLICATIONS

Written Opinion (PCT/ISA/237) dated Oct. 25, 2019, by the European Patent Office as the International Searching Authority for International Application No. PCT/EP2019/073199.

* cited by examiner

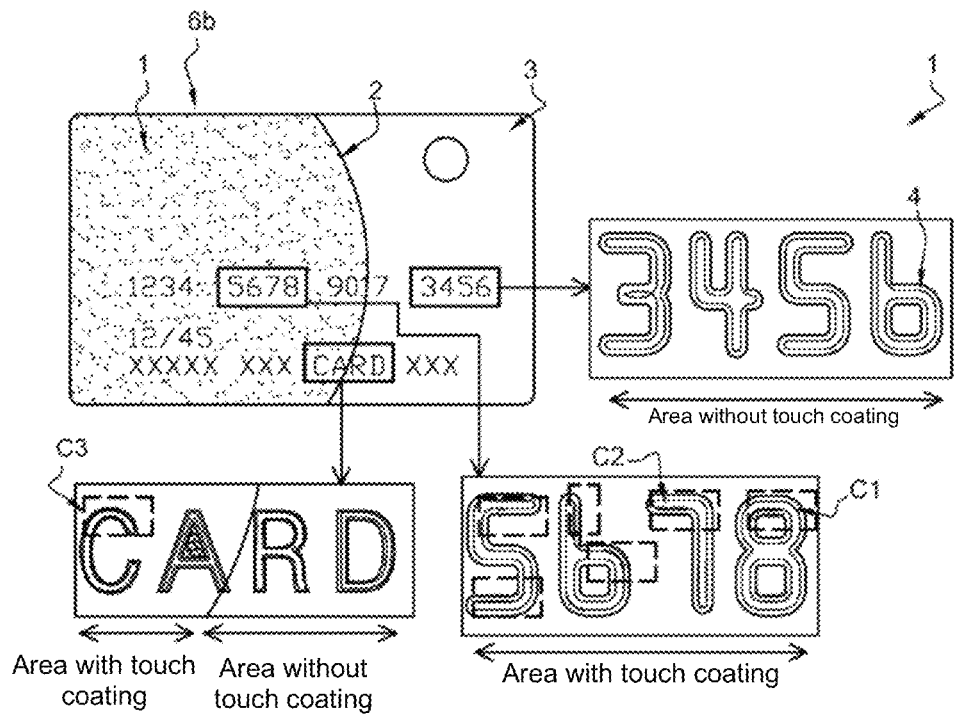
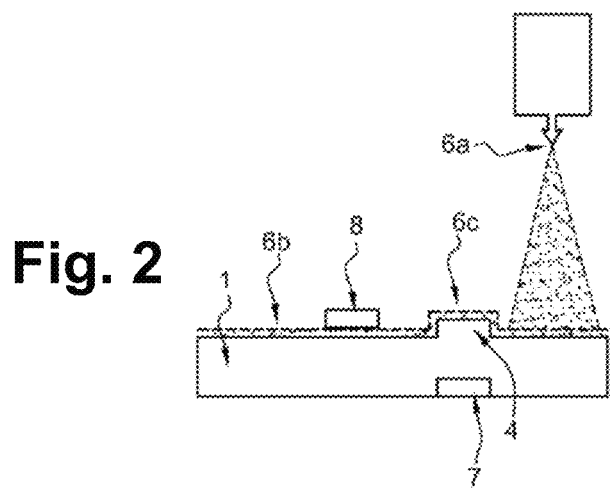

METHOD FOR MANUFACTURING A MICROCHIP SUPPORT WITH A SURFACE EFFECT

FIELD OF THE INVENTION

The invention relates to a method for manufacturing a support body with a surface effect.

In particular, it relates to the manufacture of media with personalised graphics and a surface effect, such as matt or mirror, and indicated hereinafter as "touch effect" because the difference in effect (or surface treatment), can be detected by touching the support body.

The invention mainly relates to media belonging to the field of smart cards (identity, banking, loyalty, access, etc.), comprising various materials such as wood, metal and/or plastic, or natural or synthetic polymer. However, it could relate to other products or laminates, in particular in standardised or non-standardised smart bank card format, with or without a microchip, passports, laminated sheets, radio frequency tickets (RFID).

Smart cards may or may not have a radio frequency function and may be of the contact and/or contactless type.

The invention relates more particularly to bank cards, credit and debit cards, cards with biometric sensors, display cards, embossed bank cards, and/or cards with security logos, holograms, etc.

PRIOR ART

The method for obtaining touch effects (matt or mirror) on smart cards using screen printing during the smart card manufacturing process is known.

By definition, in the totality of this document, the touch effect relates to the sense of touch, as indicated by the word. When the surface treatment of a card makes it possible to obtain a difference to the touch between textures (smooth, rough, wood grain, soft touch, etc.) of the card, that difference is reflected in a touch effect on the card or given to the card by said processing.

The touch effect is added by applying a layer of coating on top of the final product, giving it a matt or mirror finish depending on the coating used.

In some countries with extreme climate conditions (high temperature and humidity), when smart bank cards are stacked after manufacturing, the inventors have observed a problem due to the migration of components of the signature panel placed on the back of the bank card to the touch coating (matt or glossy) applied on the front of the cards.

That problem can be avoided by using dividers (or sheets) between the cards, but this adds the steps of adding and removing the dividers.

Another technical problem lies in the compatibility of the touch coating with all the personalisation processes (or techniques) used: laser, embossing (causing cracks at the top of the embossed areas), thermal transfer (not compatible with touch coating), hot hologram stamping, etc.

Thermal transfer marking of personalisation information on a card body does not adhere well when the surface of the latter is coated.

Similarly, holograms, in particular aluminium holograms applied by thermal transfer, do not adhere well because of the coating on the surface.

As regards the embossing of personalisation characters, cracks occur at the top of the characters embossed on the coating, which can spread into the underlying layers of the card body.

One solution devised by the inventors is to use metal plates with engraved and/or variably smooth (or rough) surfaces to hot stamp cards and obtain a surface condition very similar to the touch effect (matt or glossy) of coating or with personalisation elements on the external surfaces of the cards. However, this method would imply having a large number of engraved plates, which would be excessively expensive for large-scale production.

Further, the engraved plates must be positioned accurately in relation to offset printing (plates with registration (or positioning) pins which allow the sheets to be positioned in relation to the engraving). That solution of the inventors appears complex, very expensive and therefore more suitable for small runs than large-scale manufacturing runs.

Polymer films made by the company Kurz are known, which are generally used as backing for thermal transfer materials (metallisation, holograms, etc.) in order to transfer them thermally and physically onto the card (by hot stamping).

This type of film from Kurz seems to be used only as backing film to carry materials or other elements (holograms, etc.) to be physically transferred from the source backing film to a target medium. The film therefore operates as hot transfer material backing film, always associated with the material or an element to be transferred physically and entirely from the source backing film to another medium that receives the element.

Document U.S. Pat. No. 3,897,964 describes an identification card and its manufacturing process. A coloured layer is attached on a card body and then patterns in the form of fine points or lines are engraved on the surface of the coloured layer.

Technical Problem

The invention aims to overcome the aforementioned drawbacks.

The aim of the invention is a method for manufacturing a flexible medium in card format (in the wide sense and any dimensions) including one or more graphics personalisation steps, and having a touch surface that does not present the problems above.

The invention relates to a process which is preferably economical industrially (for large-scale production).

It is preferably aimed at the manufacture and personalisation of smart cards, in particular bank cards (credit, debit) or electronic passports.

SUMMARY OF THE INVENTION

The invention proposes a method for manufacturing a support body, in card format, with graphics personalisation and a surface finish effect on said support body that is variably smooth, rough, mirror or matt; wherein said method comprises the step of providing a support body having a layer of material configured to allow marking by punching or lamination;

The method is characterised in that said layer is exposed on the main external surface and in that said surface finishing effect is equivalent to that of coating and is obtained by a marking or lamination step without comprising a coating application step.

Thus, the invention overcomes the above drawbacks by eliminating the coating (after numerous observations and considerations by the inventors) and by obtaining an effect equivalent to that of coating, by implementing a finishing step using a surface marking technique.

Indeed, the inventors have analysed the situation and deduced that coating was the reason for the undesirable effects, referred to above, on the card.

The elimination of coating (as well as its benefits of a touch effect) is only made possible thanks to a graphics personalisation manner that can provide a similar result for a reduced cost and at industrial speeds.

For reasons of manufacturing speed and cost, personalisation or obtaining the finishing surface effect is advantageously carried out by means of marking or punching or lamination of the surface of the card through film. However, direct marking (with no intermediate film between a pressing tool and the medium) is not excluded, in particular for small runs or production quantities.

In a preferred embodiment, graphics or a graphics pattern on a first-scale level known as macroscopic is reproduced on the punch while graphics or a graphics pattern on a second scale level known as microscopic is reproduced on the film. The ratio between the two aforementioned first and second scale levels may for example be a factor of 10, 100, 1,000 or more. The pattern or raising on the punch may be greater or wider than that produced on the film or vice versa.

A finishing effect similar to matt or mirror coating is obtained by using film having on its surface a surface condition with variable roughness or irregularities or smoothing, making it possible to obtain a similar matt or mirror effect.

Although marking is carried out through film, the invention does not however exclude, in a less preferred version, marking by direct contact by the punch on the external surface of the card body (since coating has been eliminated from the surface of the card body).

According to other characteristics:
The layer is in polymer material;
the polymer film is a continuous tape;
The continuous tape is moved in steps after each punch strike to offer a new surface of unpunched tape at each punch strike or after a predetermined series of punch strikes;
The film or tape has a matt or mirror surface;
The punch has a raised and/or recessed personalisation pattern relative to the main surface of the punch;
The film or tape is polymer film;
The material of the polymer film or tape is chosen from polyethylene terephthalate (PET), polycarbonate (PC
Marking may use the hot process, for example between 100° C. and 250° C.;
Graphics personalisation comprises the application of a hologram and/or embossing and/or a marking by thermal transfer and/or laser personalisation and/or application of a signature panel;
The film has a raised graphics pattern and/or a surface finish with a matter or mirror effect.

The invention also relates to a support body, in card format, with graphics personalisation exhibiting a surface finish effect on said support body that is variably smooth, rough, mirror or matt; wherein said support body has a layer of material configured to allow marking by punching or lamination;

Said support body is characterised in that said layer of material is exposed on the main external surface and exhibits a surface finishing effect (or surface condition) equivalent to that of a surface finishing condition of coating. Raised patterns marked or formed in the material of said layer are free from coating. The material layer therefore has a finished external surface (without subsequent coating), but which offers an effect similar or equivalent to that of coating.

Preferably, the external layer is preferably of polymer material.

DESCRIPTION OF DRAWINGS

FIG. 1 illustrates a test card based on a smart card of the prior art with an area 3 that is free from coating;

FIG. 2 schematically illustrates the method for obtaining a smart card with a matt or mirror effect according to the prior art;

DESCRIPTION

Figure 3:
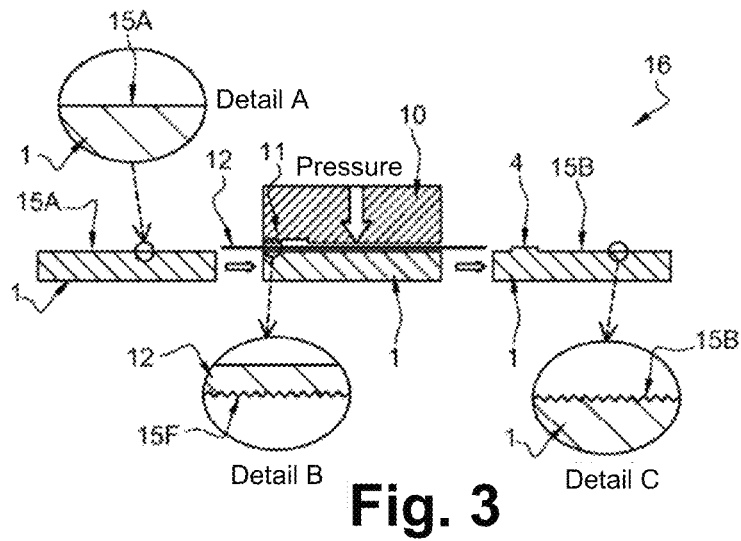
FIG. 3 illustrates an installation for implementing the method according to the invention in a preferred embodiment (with the use of intermediate film 12)

FIG. 1 illustrates a support body in card format according to the prior art exemplified here in the form of a smart bank card. The card acts as an observation test to identify the problems to overcome and show the way to a solution. It conventionally comprises a card body 1 with graphics personalisation and with an area 2 on the left, exhibiting a touch surface effect on the card body, wherein said effect is obtained by applying coating by screen printing or spraying material 6. On the right, there is an area 3 with a surface that intentionally does not comprise surface coating. The test (or observation) card 1 has embossed characters 4 such as a bank card number or other information which extends over the two areas 2 and 3.

It can be seen visually that the characters "5678" referenced 4 in the area with coating exhibit coating damage (cracks, crazing (C1, C2)) over time and also damage to the underlying material of the card body. The same applies to the characters "CARD" located in area 2 with coating: the characters exhibit cracks C3.

Conversely, the characters "3456" in area 3 (without coating) do not exhibit such physical and mechanical damage in the material under the embossing.

This test card produced by the inventors particularly highlights the effects or behaviour of the coating.

FIG. 2 is a schematic illustration of the conventional coating step of the prior art 6a on a card 1 of the type of FIG. 1A. The card 1 may conventionally comprise, according to the prior art, embossed areas 4 (hollows 7 and corresponding bumps 4) and areas comprising on their surface added material 8 (hologram, marking) applied by transfer, in particular by thermal transfer, using hot transfer film 9 (not shown in this figure but identical or similar to the film of FIG. 2A).

According to the prior art, the coating spray 6a is respectively applied on the card and respectively forms a layer 6b, 6c on the main flat surface of the card and on the embossing areas 4; Then the material 8 (e.g., a hologram, marked information) is transferred by hot transfer onto the layer of coating 6b.

FIG. 3 illustrates a schematic installation for implementing the steps of the method (FIG. 5) of the invention in accordance with a preferred example or embodiment.

To allow a comparison between the invention and the prior art, the steps of the method for making a smart card body with graphics on the surface corresponding to that of FIG. 1A for area 2 will first be described in FIG. 4.

The methods for manufacturing a support body in card format with graphics personalisation exhibiting a variably smooth, rough, mirror or matt surface finish effect on said support body, respectively according to the prior art and according to the invention, share step 100 or (100i) which consists in providing a support body 1 having a layer of material configured to allow marking by punching or lamination, In the example, the support body 1 is a smart card body obtained by lamination with a layer of plastic material on the surface such as ABS, PE, PET or PC. The body may also be obtained by injection and comprise a single layer. It may however be a card body with no microchip in difference sizes or surfaces or thicknesses.

Where appropriate, the body may have a metal layer on the surface (aluminium, silver, platinum, steel, gold or alloy).

In step 110 (FIG. 4), the prior art implements a graphics printing step (by screen printing, inkjet, offset, etc.) on the support body 1 or said external layer;

In step 120, the prior art implements a step of spraying 6a or applying a layer of coating on the surface of the support body (here card body 1☐-☐ see area 2 of FIG. 1);

In the final step 130, the prior art implements one or more steps of embossing and/or marking by punching to create a raised surface, or marking by thermal transfer with the application or transfer of material, such as a hologram or any personalisation information.

The method is characterised in that said layer is exposed on the main external surface and in that said surface finishing effect is obtained by a marking or lamination step without comprising a coating application step.

Figures 4, 5:
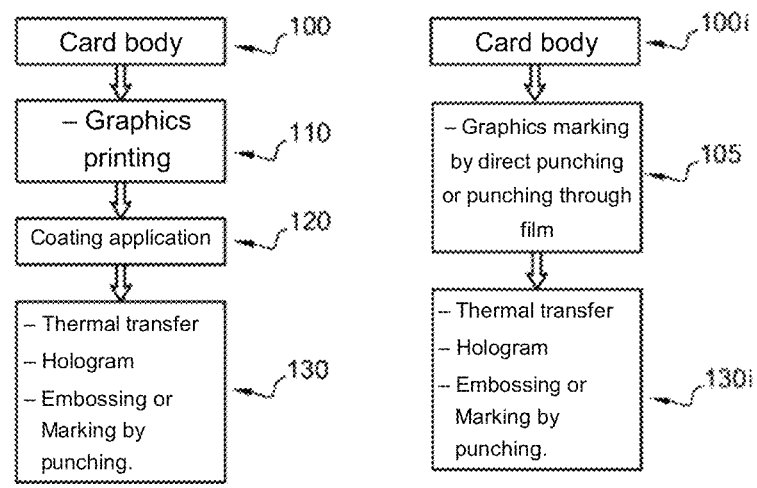
FIG. 4 illustrates the steps of the current method for manufacturing a card with a touch effect (mirror or matt)
FIG. 5 illustrates the steps of the method according to the invention in its preferred embodiment.

On the contrary, the method of the invention (illustrated in FIG. 5) by steps 100i, 105, 130i, differs through a step 105 in that steps 100i and 130i are identical to steps 100, 130 of the prior art (shown in FIG. 4).

In step 105, said "layer of material configured to allow marking by punching or lamination", is exposed on the main external surface;

In addition, the invention provides for obtaining said surface finishing effect by a marking or lamination step without comprising a coating application step.

The implementation of such surface marking 105 (or lamination) can be obtained by punching the surface or the external layer of the card body. Punching may be carried out in the preferred example with an installation 16 illustrated in FIG. 3.

The installation comprises punching means shown here by a punch 10. The punch is configured with actuating means for exerting striking or pressing force (preferably when hot) on a striking surface. The striking surface has a raised pattern (here a hollow 11) relative to the main surface of the punch.

Punching or marking 105 can be carried out according to one embodiment using a punch 10 (FIG. 3) comprising a raised pattern 11 on its striking surface (intended to press or strike against the film. Alternatively, punching or marking can be carried out, (in a less preferred secondary embodiment), directly (without intermediate film 12) on the surface of the support body or card 1.

Alternatively (according to the preferred embodiment with intermediate film 12), the raising 11 can be formed directly on the film 12 rather than on the punch 10. After that, a punch with a flat striking head in particular (with no raised parts 11), can apply pressure on the support body, via the film 12, and form the corresponding raised part 11 of the film on the surface of the support body by deforming (or stamping) the main surface of the card body.

The installation 16 shows the conveying of the card to a position under a punch P with a raised part 11 on the striking surface;

The card is stamped using the punch 10 to mark the raised part

In the case of the preferred embodiment, marking is carried out by punching using the above punch through film 12 or tape placed between the punch 10 and said main surface. The film in the example is transparent film of PET material with a surface condition for a matt finish on the card. PET is preferred for temperature resistance, the card being in PVC or at least having an external layer of PVC.

To that end, the invention has an installation 16 (FIG. 3) for the graphics personalisation of a smart card body with a surface touch effect on the card body. The installation may comprise means for conveying the card body to punching means 10.

On their main surfaces, the card bodies have a layer of material with hardness that allows marking by punching.

The installation comprises means for punching 10, 11 or for marking the surface of the card. These means comprise a punch 10 with a striking surface and a raised pattern 11 on its striking surface; A plate (or anvil) for supporting the card and counter-reacting to the pressure of the punch is not shown.

The installation 16 comprises conveying (or insertion) means for interposing (or inserting) film 12 between the punch 10 and the surface 15A of the card (surface visible in detail A FIG. 3). To that end, the installation may provide pay-out and take-up rollers (not shown) to pay out and take up a tape of film 12 and card body pickers and stackers (not shown).

The installation preferably comprises means for carrying out said marking, by punching or lamination, through the film 12 placed between the punch 10 and said main surface 15A.

In the example, the installation is a Kurz MM 7000 machine. The film 12 is placed directly between the punch 10 and the card body 1. Also in the example, the film 12 is a PET polymer film from Kurz. It may be 12 μm thick. For a mirror effect, the part number of the film is glandzend 93324 and for a matt effect, the part number of the film is Mat 93325.

The film or tape 12 may be at least as wide as the card or as the raised pattern to be punched (or laminated) as the punch. Preferably, the film may be film that is harder than the surface layer of the card body. The film may be metallic film.

Preferably, in the case of hot punching, the softening temperature of the film may preferably be higher than that of the surface layer of the card body.

Preferably, the film (or tape) takes the form of continuous tape and is paid out continuously between the punch and the card by a motor between two pulleys or drive rollers (or film pay-out rollers).

The continuous tape 12 may be moved, at each punch strike or after a predetermined series of punch strikes, from one punching position to the next to offer a new unpunched tape surface. To that end, the installation can use a step motor (not shown).

According to one characteristic, the film or tape may have a matt or mirror surface. A matt or mirror surface effect is produced on the card due to the roughness or smoothness on the surface of the film. Thus, an effect similar to that of coating can be obtained.

In FIG. 3, the film 12 has a rough surface condition on its underside 15 F for a matt effect equivalent to matt effect coating.

The card conveyed to the start of the path before punching has (for example) a smooth surface 15A (Detail A, FIG. 3) or a surface specific to PET.

At the punching station, the card is subjected to the pressure of the punch (preferably hot) through the film 10.

The raised pattern 11 appearing on its striking face is reproduced through the film 11 on the external face of the card body.

Similarly, the surface condition (or roughness) 15F (detail B) on the surface of the film 12 is reproduced on the surface of the card body in the form of a corresponding surface condition 15B (Detail C).

According to one characteristic, the punch may have a personalisation pattern that may be raised and/or recessed relative to a main surface of the punch. The pattern may have a variety of extents and forms. For example, raised grid lines, circles, symbols, logos, alphanumeric characters, etc. may be formed on the striking face 11 of the punch. The patterns 11 on the punch may be of a larger dimensional level than those appearing on the surface of the film (for example, the raising (height, width may be 10 to 1,000 times greater).

The material of the polymer film or tape is chosen from polyethylene terephthalate (PET), polycarbonate (PC) etc.

Marking or punching is preferably carried out hot, for example between 100° C. to 250° C.

Alternatively, the punching film or tape may itself exhibit raised areas formed by other means. The raised area may be in material that is identical to or different from that of the film or tape.

The raised area may be formed by additive or subtractive method. For example, a raised pattern can be formed by a 3D printer on the film or tape.

The advantage is to be able to change the patterns to be punched or stamped on the card very easily by varying them along a tape according to graphics personalisation requirements.

Alternatively, metallic or plastic raised patterns (the graphics of which are to be transposed onto the surface of the card) may be attached to the tape, in particular with adhesive.

Thus, the method of the invention makes it possible to obtain a support body, in card format, with graphics personalisation having a variably smooth, rough, mirror or matt surface finish effect on said support body.

The support body has a layer of material configured to allow marking by punching or lamination.

According to one characteristic, the layer of material is exposed on the main external surface and exhibits a surface finishing effect with raised patterns marked or formed in the material of said layer, at the same time being free from coating.

The layer of external material may or may not be of the polymer type (metal, wood, etc.) and forms a finished main external surface of the support body of the invention.

The external layer, located on the main surface of the card, may exhibit, on its external surface, raised patterns formed in the thickness of the external layer of material (that located outermost on the card body).

Where appropriate, the method of the invention may carry out several punch strikes with different film and different punches. For example, graphics to be reproduced on a medium are on a first film and are reproduced using a punch with a flat head (without a raised pattern), then at another station the method uses a second film having a micro-raised surface 15F (or surface finish) for a touch surface effect (matt or mirror) which is reproduced on the medium using a punch with a striking head which is also flat.

Subsequently, if it is necessary to reproduce a bank number, it can be formed by direct embossing on the medium or by inkjet directly on the card body.

According to an alternative embodiment, the film 12 may include both patterns to give a matt surface finish and other patterns to give a mirror finish to the support body 1. In that way, graphics personalisation patterns can be obtained on the support body and are visible through the contrast between the different surface finishing effects (matt or mirror) of the different patterns. Indeed, on their own, different surface finishes on different predetermined areas can constitute the graphics personalisation of the support body.

The invention claimed is:

1. A method for manufacturing a support body, in card format, with graphics personalisation and a surface finish effect on said support body, such that the surface finish is variably smooth, rough, mirror or matt;
    wherein said method comprises the step of applying a film on the support body thereby providing a layer of material configured to allow marking by punching or lamination,
    wherein raised graphics patterns are exposed on said layer of film on a main external surface of said support body, thereby providing said surface finishing effect similar to that of a coating obtained by the punching or lamination step on said film without use of a coating application step.

2. The method according to claim 1, wherein said marking is carried out by said punching through said film placed between a punch and said main surface.

3. The method according to claim 2, wherein the film is in the form of a continuous tape.

4. The method according to claim 3, wherein the continuous tape is moved step by step from one punch strike to the next to offer a new surface of unpunched tape at each punch strike or after a predetermined series of punch strikes.

5. The method according to claim 2, wherein the film has a matt or mirror surface.

6. The method according to claim 2, wherein the punch has a personalisation pattern that is raised and/or recessed relative to a main surface of the punch.

7. A method according to claim 2, wherein the film is made of polymer material or metal.

8. The method according to claim 7, wherein the material of the polymer film is chosen from polyethylene terephthalate, polycarbonate.

9. The method according to claim 2, wherein the film comprises a raised graphics pattern and/or a surface finish with a matt or mirror effect.

10. The method according to claim 2, wherein several punch strikes are performed with different films and different punches.

11. The method according to claim 1, wherein marking or punching is carried out hot between 100° C. to 250° C.

12. The method according claim 11, wherein said graphics personalisation comprises the application of a hologram and/or embossing and/or thermal transfer marking.

13. A support body, in card format, with graphics personalisation exhibiting a surface finish effect on said support body that is variably smooth, rough, mirror or matt;

wherein said support body include a film applied on a main external surface, thereby providing a layer of material configured to allow marking by punching or lamination, wherein raised graphics patterns are exposed on said layer of film on the main external surface exhibits a surface finishing effect similar to that exhibited by a coating process, with raised patterns marked or formed in said layer of film due to said punching or lamination, yet free from coating.

14. The support body according to claim 13, wherein said layer of film is a polymer or metallic material.

15. The support body according to claim 13, wherein the support body forms a smart bank card body.

* * * * *